April 12, 1966     S. H. QUANBECK     3,245,480
TRIP TYPE DRAFT CONNECTION
Filed Oct. 7, 1964
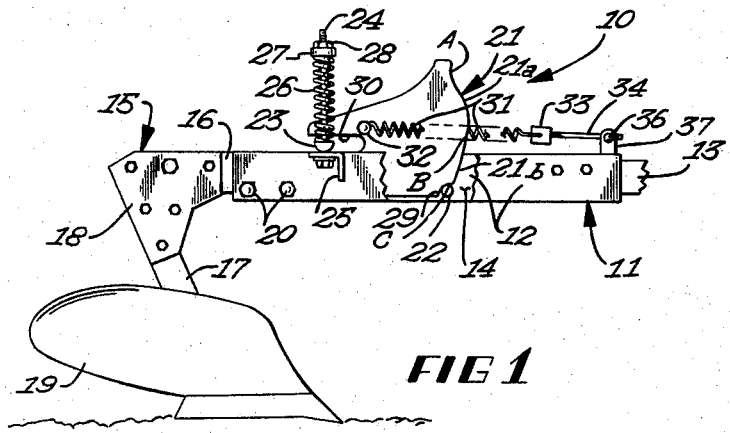
FIG 1
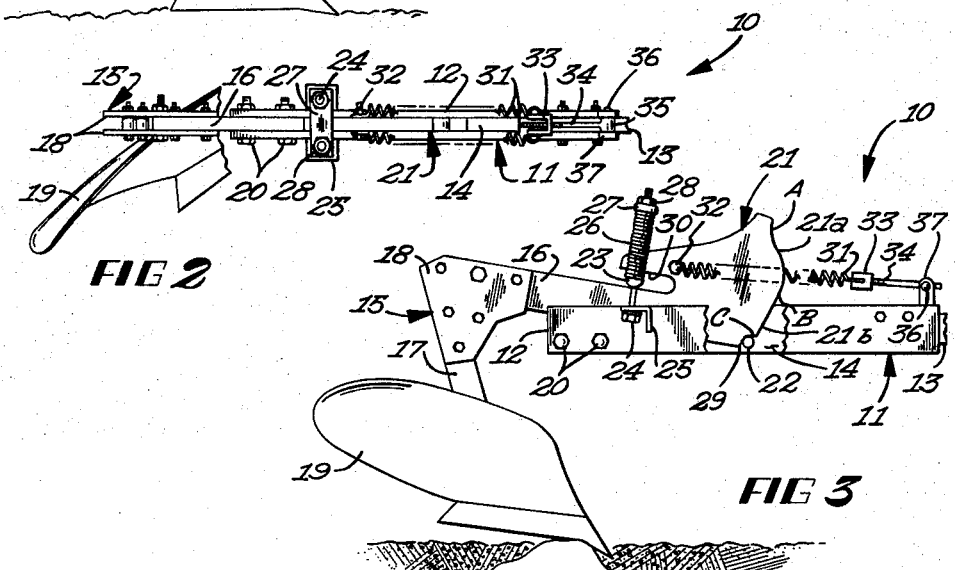
FIG 2
FIG 3
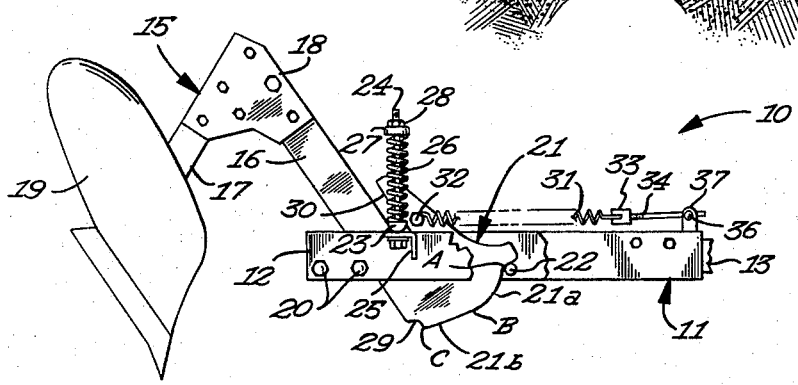
FIG 4
INVENTOR.
SHERMAN H. QUANBECK
BY
    *Williamson & Palmatier*
           ATTORNEYS United States Patent Office 3,245,480
Patented Apr. 12, 1966

3,245,480
TRIP TYPE DRAFT CONNECTION
Sherman H. Quanbeck, Aneta, N. Dak.
Filed Oct. 7, 1964, Ser. No. 402,113
6 Claims. (Cl. 172—705)

This invention relates to draft connections for agricultural implements and more specifically to a trip type or yieldable draft connection for an agricultural implement such as a plow.

An object of this invention is to provide a novel and improved trip type draft connection for an implement, such as a plow, and which is vertically yieldable when the implement engages an obstruction, resilient means extending between the yieldable connection for resisting vertical movement of the implement, the means becoming progressively tensioned as the implement is vertically shifted whereby when the implement traverses the obstruction, the force exerted by the tensioned resilient means serves to very positively assist the return of the implement to its normal position.

A more specific object of this invention is to provide a novel and improved trip type draft connection for an agricultural implement in which thte implement trip means is provided with a positioning member and is capable of both longitudinal and vertical shifting movement relative to a normal operative position alternately about a pair of pivots in response to engagement of the implement with an obstruction, the connection including pre-tensioned resilient means connected to the positioning member and so interrelated with the pivots whereby when the implement is tripped the tension of the resilient means increases as the implement is moved vertically so that the resilient means positively assists in restoring the implement to its normal operative position.

These and other objects and advantages of the invention will more fully appear from the following description made in connection with the accompanying drawings, wherein like character references refer to the same or similar parts throughout the several views, and in which:

FIG. 1 is a side elevational view of a draft connection embodying the present invention, the agricultural implement illustrated being a plow;

FIG. 2 is a plan view of the invention;

FIG. 3 is a side elevational view similar to FIG. 1 but illustrating the plow in a partially tripped position and traversing a small or minor obstruction; and FIG. 4 is a side elevational view similar to FIG. 1 but illustrating the plow in the tripped position traversing a large or major obstruction.

Referring now to the drawings, it will be seen that one embodiment of my novel draft attachment, designated generally by the reference numeral 10, is there shown. This draft connection 10 includes a main beam 11 which may be part of a gang frame formed of a plurality of such beams arranged in parallel relation and which carry an agricultural implement such as a plow share in echelon. This main beam is comprised of a pair of laterally spaced-apart elongate substantially flat side plates 12 which are bolted or otherwise secured to opposite sides of an elongate spacer bar 13 and which project rearwardly therefrom.

It will therefore be seen that the rearwardly projecting laterally spaced-apart portions of the side plates define a slot 14 therebetween, which very nicely accommodates therein the horizontal leg 16 of the trip beam 15. It will be noted that the trip beam 15 also includes an elongate shank 17 which is secured to the rear end of the horizontal leg 16 by means of suitable gusset plates 18. This shank 17 extends downwardly and forwardly thereof, the lower end portion being secured in a conventional manner, in the embodiment shown, to a plow share 19 which is also of conventional construction. The horizontal leg 16 is limited in movement in a downward direction from its normal horizontal position as illustrated in FIG. 1 by suitable stop means 20 which are in the form of a pair of bolt assemblies disposed in side-by-side relation and each extending through suitable apertures formed in the respective lower rear portions of the side plates 12.

A positioning plate 21 is integrally formed with the forward end of the horizontal leg 16 of the trip beam 15, as best seen in FIG. 1. It will be noted that this positioning plate 21 is of substantially flat construction but is oriented vertically and projects upwardly from the horizontal leg 16 of the trip beam 15 when the trip beam is in its normal operating position.

The trip beam 15 is also provided with two pivots or fulcrums which are longitudinally spaced-apart and which permit upward swinging movement of the trip beam against the bias of yieldable means. These pivots include a front fixed pivot 22 and a rear movable pivot 23. These pivots are actually in the form of rollers and it will be seen that the front fixed pivot 22 is positioned between and revolvably mounted on the side plates 12 of the main beam 11.

The rear pivot 23 is mounted on the main beam 11 for limited vertical movement relative thereto. The means for mounting this rear pivot comprises a pair of substantially identical elongate bolt members 24 each of which projects through an aperture in an angle bracket 25 affixed to one of the side plates 12 and projecting laterally outwardly from the exterior surface thereof, as best seen in FIGS. 1 and 2. Each bolt has one of a pair of springs 26 disposed in encircling relation therewith, the upper ends of the springs bearing against and being retained by a substantially flat horizontally disposed strap or plate 27 which is suitably apertured at opposite ends thereof and through which the bolts 24 project. Suitable threaded retaining nuts engage the threaded upper end of the bolt members 24 and serve to retain the strap 27 thereon. The bolt members 24 also project through suitable eye elements which are affixed to the opposite ends of the axle for the rear roller 23 and it is pointed out that the lower ends of the springs 26 engage the eyes in bearing relation therewith. It will therefore be seen that the rear pivot 23 is normally urged downwardly by the springs 26 and upward movement of this roller will be against the bias of the springs.

The positioning plate 15 is provided with a forwardly opening slot or recess 29 in the front end thereof and this slot accommodates the front pivot 22 therein when the trip beam is in the normal operating position. The positioning plate 15 is also provided with a rearwardly opening elongate slot or recess 30 therein which, as seen, accommodates the rear pivot 23 therein and which is disposed in substantially parallel relation with respect to the trip beam 15 when the latter is in the normal operating position.

It will be noted that the trip beam 15 while being mounted for vertical swinging movement alternately about the pivots 22 and 23, may also be longitudinally shifted from its position illustrated in FIG. 1 in a rearward direction. Means are provided for yieldably resisting this rearward shifting of the trip beam and for also assisting in positively urging the trip beam to its lowered operative position when the latter is pivoted. This means includes a pair of elongate helicoid springs 31 which, as seen, are disposed in substantially horizontal relation and are positioned on opposite sides of the positioning plate 21 and project forwardly therefrom. It will be noted that the respective rear ends of the springs 31 are anchored by suitable bolt assemblies 32 to opposite sides of the positioning plate 21. It is pointed out that the positioning plate 21 is apertured to accommodate the bolt assemblies 32 so that the anchored rear ends of the springs 31 are transversely aligned with respect to each other. It will also be noted that the point of connection 32 of the springs 31 is positioned slightly forwardly of the above movable pivot 23.

The respective forward ends of the springs 31 engage the rearwardly extending legs of a U-shaped member 33, the bight portion of the U-shaped member 33 being provided with a threaded aperture for receiving the rearward threaded end of an anchor bolt 34. The T-shaped tubular end 35 of the anchor bolt 34 is journaled upon a horizontally disposed transversely extending pivot 36 which is secured to the legs of a bracket 37 carried by the forward end portion of the main beam 11. Thus it will be seen that any rearward longitudinal sliding movement of the trip means 15 will be against the bias of the springs 31.

During operation of the draft connection 10 when used, for example, with a plow share, the trip means will be disposed in the normal operating positions as illustrated in FIG. 1. The trip beam 15 will be held against displacement by the action of the force exerted by the springs 26 with respect to the rear pivot 23 and the force exerted by the horizontally disposed springs 31. The latter springs also resist rearward displacement of the trip beam 15 and normally urge the forwardly facing surface defined by the slot 29 into engaging relation with respect to the front pivot 22. Thus in the embodiment shown, the front pivot 22 also serves to limit forward movement of the trip beam but it is pointed out that an additional stop means in the form of an abutment may be provided in the manner of my United States Letters Patent No. 3,052,308 to limit forward movement of the trip beam.

It will therefore be seen that the combined forces exerted by the springs 26 and 31 restrain relative movement of the trip beam with respect to the main beam but do permit movement of the trip beam when the force of these springs is overcome as when the plow share 19 engages on obstruction. This condition is illustrated in FIG. 3 wherein the plow share 19 has engaged a relatively small obstruction and is slightly vertically displaced to traverse such an obstruction. During this operation, the trip beam 15 is limited in its vertical movement about the front pivot 22 by the coaction of the spring urged rear pivot 23 with the leg portion 16 and positioning plate 21 of the trip beam 15. During this limited swinging movement of the trip beam 15, the arcuate forwardly facing edge surface which defines the slot 29 of plate 21 is held in engaging relation with this front pivot 22. After the plow share 19 has traversed such an obstruction as illustrated in FIG. 3, the action of the springs 26 returns the plow share and trip beam to the lower operating position. The springs 31 are also a factor in the return of the plow share and trip beam to the lower operating position when the beam has been displaced upwardly about pivot 23.

If on the other hand, however, the plow share should engage a relatively large obstruction as illustrated in FIG. 4, the plow share and trip beam 15 will be urged longitudinally rearwardly relative to the main beam 11 and against the resistance imparted by the spring 31 until the front pivot 22 is displaced from the slot 29. Thereafter the trip beam will swing vertically about the rear pivot 23 until the obstacle is traversed by the plow share 19. In the event the trip beam 15 is not longitudinally displaced rearwardly, the forward edge surface of the positioning plate 21 will engage the front pivot roller and will be held thereagainst while being moved relative thereto.

During this operation it is desirable that the tension of the springs 31 be increased. Therefore the positioning plate is arranged and constructed and is interconnected to the springs 31 so that these springs are progressively tensioned during such swinging movement of the trip beam. To this end, the front surface of the positioning plate is arcuately shaped and this front edge although continuous is actuately formed by two separate radii. Thus that arcuate portion 21a from point A to point B is formed by a radius using the pivot 23 as a center. The arcuate portion 21b of the front edge of the positioning plate which extends from point B to point C has its center located at a point slightly above and forwardly of the pivot 23. With this particular arrangement as the front surface of the positioning member 21 is cammed over the front pivot roller 22 from point C to point A the anchoring point of the springs 31 will be moved rearwardly and slightly downwardly during the tripping action. Thus the springs will be progressively tensioned during this tripping operation and will positively assist in moving the plow share and trip beam to the normal operating position.

The particular configuration and construction of the positioning plate 21, the interrelation thereof to the pivot points and the disposition and points of connection of the springs 31 to the positioning plate involve essential features of the present invention. It will be noted that the front pivot 22 functions as a cam roller and the continuous arcuate surface 21a, 21b defines a cam follower surface. The distance from point A from pivot 22 is greater than the distance from point B to pivot 22. Similarly, the distance from point B to the pivot 22 is greater than the distance from point C to pivot 22 whereby when the positioning plate 21 is cammed along the pivot 22 from point C to point A the pair of springs 31 will be progressively tensioned but this increased tension will be progressively diminished as the pivot plate is returned to its original position. It is also pointed out that the tension exerted by the spring 31 while the trip beam 15 is in the normal operating position may be adjusted to a desirable predetermined amount by adjusting the U-shaped member 33 relative to the bolt 34. However, it will be noted that since this predetermined spring tension is actually increased during the tripping action of the trip beam the plow share and trip beam will be positively assisted in the return thereof to the normal operating condition. The plow share is also urged from a tripped position towards a normal operating position by the action of gravity thereon.

It is pointed out that it is desirable in some instances to substantially increase the tension of the springs 31 to increase the resistance of the trip beam against swinging or longitudinal or retractive movement. This adjustment of the draft connection is quite often necessary when attempting to plow sod or substantially hard soil, wherein the draft force is increased over ordinary conditions. The present embodiment of my draft connection permits an operator to pre-set the springs 31 with increased tension because of such conditions without interfering with the normal operation of the draft connection. In other words, since the tension of the springs 31 will progressively increase from any predetermined amount, there will be no over-center effect produced by the trip beam and no diminishing of the tension thereof even when the trip beam has been pivoted through its maximum distance. Therefore the effect of the springs 31 is to constantly and positively urge the trip beam to its normal operating position.

It will therefore be seen that I have provided a novel trip type draft connection which allows an earthworking implement such as a plow to be readily tripped in response to engagement with an obstacle and is also arranged and constructed to positively assist in the return of the plow and trip beam to its normal operating position without necessitating manual assistance from the operator. Thus the trip beam may be readily re-set in the operative position by moving the gang plow vehicle rearwardly in a well known manner.

It will also be seen from the foregoing description that my novel trip type draft connection includes yieldable tensioning means which resist displacement of the plow trip beam during the tripping operation, the yieldable means also being so interrelated to the plow trip beam that the same are progressively tensioned during the tripping operation whereby the forces which urge the plow to its normally operating condition are progressively increased.

Thus it will be seen that I have provided a novel draft connection which is not only of simple and inexpensive construction but one which functions in a more efficient manner than heretofore known comparable device.

It will, of course, be understood that various changes may be made in the form, details, arrangement and proportion of the various parts without departing from the scope of my invention.

What is claimed is:

1. A draft attachment for plows and the like comprising
   a main beam,
   a trip beam movably mounted on said main beam for movement relative thereto from a normal operating position and for return thereto,
   means defining a pair of longitudinally spaced-apart front and rear pivots on said main beam,
   a positioning member on said trip beam having a front slot and a rear slot therein respectively receiving and seating said front and rear pivots, and cooperating with said pivots to permit said trip beam to alternately vertically swing about the latter relative to said main beam, said positioning member having a front edge defining a vertically oriented continuous cam engaging surface above said front slot and engaging said front pivot during pivoting movement of said trip beam about said rear pivot, said camming surface including an upper portion having a predetermined radius of curvature, and including a lower portion having a radius of curvature of lesser magnitude than the radius of curvature of said upper portion,
   and a resilient member extending between and connected to said main beam and to said positioning member and normally holding the positioning member against said front pivot and yieldably resisting upward swinging movement and longitudinal displacement of said trip beam, the point of connection between said resilient member and said positioning member being related to said camming surface whereby upon upward swinging movement of said trip beam about said rear pivot said resilient member will progressively stretch and will be progressively tensioned.

2. A draft attachment for plows and the like comprising
   a main beam,
   a trip beam movably mounted on said main beam for movement relative thereto from a normal operating position and for return thereto,
   means defining a pair of longitudinally spaced-apart front and rear pivots on said main beam,
   a positioning member on said trip beam having a front slot and rear slot therein respectively receiving and seating said front and rear pivots, and cooperating with said rear pivots to permit said trip beam to alternately vertically swing about the pivots relative to said main beam, said positioning member having a vertically oriented front edge defining a continuous arcuate cam engaging surface thereon above said front slot and engaging said front pivot during pivoting movement of said trip beam about said rear pivot, said camming surface having at least two radii of curvature,
   and an elongate generally horizontally disposed resilient member extending between and connected to said main beam and to said positioning member and being pretensioned for normally holding the positioning member against said front pivot and yieldably resisting upward swinging movement and longitudinal displacement of said trip beam, the point of connection between said resilient member and said positioning member being related to said cam engaging surface whereby upon upward swinging movement of the trip beam about said rear pivot said resilient member will be progressively stretched and progressively tensioned.

3. A draft attachment for plows and the like comprising
   a main beam,
   a trip beam movably mounted on said main beam for movement relative thereto from a normal operating position and for return thereto,
   means defining a pair of longitudinally spaced-apart front and rear pivots on said main beam,
   a positioning member affixed to the front end of said trip beam and having a front and rear slot therein respectively receiving and seating said front and rear pivots, and cooperating with said pivots to permit said trip beam to alternately vertically swing about the pivots relative to said main beam, said positioning member having a front edge defining a continuous arcuate cam engaging surface having at least two radii of curvature and engaging said front pivot during pivoting movement of said trip beam about said rear pivot, said camming surface including an upper portion and a lower portion, the radius of curvature of said lower portion being smaller than the radius of curvature of said upper portion,
   and an elongate generally horizontally disposed resilient member extending between and connected to said main beam and said positioning member and normally holding the positioning member against said front pivot and yieldably resisting longitudinal displacement of said trip beam, the point of connection between said resilient member and said positioning member being disposed closely adjacent said rear slot and disposed above and forwardly of said rear pivot when said trip beam is in the normal operating position whereby upon swinging movement of the trip beam about said rear pivot said resilient member will be progressively stretched and progressively tensioned.

4. A draft attachment for plows and the like comprising
   a main beam,
   a trip beam movably mounted on said main beam for movement relative thereto from a normal operating position and for return thereto,
   means defining a pair of longitudinally spaced-apart front and rear pivots on said main beam,
   a positioning member fixedly connected with said trip beam adjacent the front end thereof and having a front slot and a rear slot therein respectively receiving and seating said front and rear pivots, and cooperating with said pivots to permit said trip beam to alternately swing about said pivots relative to said main beam, said positioning member having a vertically oriented front edge thereof defining a continuous arcuate cam engaging surface having at least two radii of curvature above said front slot and engaging said front pivot during pivoting movement of said trip beam about said rear pivot,
   a pair of similar elongate generally horizontally disposed helical springs positioned on opposite sides of said positioning member and each being connected to said main beam and to said positioning member, and being pretensioned for urging said positioning member forwardly and normally holding said positioning member against said front pivot and yieldably resisting upward swinging movement and longitudinal displacement of said trip beam, the points of connection between said resilient members and said positioning member being so related to said cam engaging surface whereby upon upward swinging movement of the trip beam about said rear pivot said resilient members will be progressively stretched and progressively tensioned.

5. The draft attachment as defined in claim 4 wherein said points of connection of said resilient members with said positioning member are disposed closely adjacent said rear slot and slightly above and forwardly of said rear pivot when said trip beam is in the normal operating position.

6. The draft attachment as defined in claim 4 wherein said camming surface includes an upper portion and a lower portion, the radius of curvature of said lower portion being smaller than the radius of curvature of said upper portion.

References Cited by the Examiner

UNITED STATES PATENTS

| 1,111,655 | 9/1914 | Jones et al. | 172—500 X |
| 3,052,308 | 9/1962 | Quanbeck | 172—264 |

FOREIGN PATENTS

| 163,951 | 7/1958 | Sweden. |

ABRAHAM G. STONE, *Primary Examiner.*

T. GRAHAM CRAVER, *Examiner.*